United States Patent
Balandin et al.

(10) Patent No.: US 8,644,148 B2
(45) Date of Patent: Feb. 4, 2014

(54) METHOD AND APPARATUS FOR USING LAYER 4 INFORMATION IN A LAYER 2 SWITCH IN ORDER TO SUPPORT END-TO-END (LAYER 4) FLOW CONTROL IN A COMMUNICATIONS NETWORK

(75) Inventors: Sergey Balandin, Helsinki (FI); Michel Gillet, Helsinki (FI)

(73) Assignee: Nokia Corporation, Espoo (FI)

( * ) Notice: Subject to any disclaimer, the term of this patent is extended or adjusted under 35 U.S.C. 154(b) by 251 days.

(21) Appl. No.: 13/128,823

(22) PCT Filed: Nov. 6, 2009

(86) PCT No.: PCT/IB2009/054937
§ 371 (c)(1),
(2), (4) Date: May 11, 2011

(87) PCT Pub. No.: WO2010/058316
PCT Pub. Date: May 27, 2010

(65) Prior Publication Data
US 2011/0216653 A1    Sep. 8, 2011

(51) Int. Cl.
*G01R 31/08* (2006.01)
*H04L 12/28* (2006.01)
*G06F 15/16* (2006.01)

(52) U.S. Cl.
USPC .......... 370/231; 370/229; 370/235; 370/389; 370/412; 709/232

(58) Field of Classification Search
None
See application file for complete search history.

(56) References Cited

U.S. PATENT DOCUMENTS

| | | | |
|---|---|---|---|
| 5,528,591 A | 6/1996 | Lauer | |
| 5,768,391 A * | 6/1998 | Ichikawa | 713/153 |
| 6,011,777 A | 1/2000 | Kunzinger | |
| 6,226,267 B1 * | 5/2001 | Spinney et al. | 370/235 |
| 6,249,819 B1 * | 6/2001 | Hunt et al. | 709/232 |
| 6,345,301 B1 * | 2/2002 | Burns et al. | 709/230 |
| 6,594,701 B1 * | 7/2003 | Forin | 709/232 |

(Continued)

FOREIGN PATENT DOCUMENTS

| | | |
|---|---|---|
| WO | 97/45978 A2 | 12/1997 |
| WO | 01/67672 A2 | 9/2001 |
| WO | 2009/083027 A1 | 7/2009 |

OTHER PUBLICATIONS

"MIPI Alliance Standard for Unified Protocol (UniPro)", Mobile Industry Processor Interface Board, v1.00.00, Aug. 25, 2007, 202 pages.

(Continued)

*Primary Examiner* — Hassan Phillips
*Assistant Examiner* — Hicham Foud
(74) *Attorney, Agent, or Firm* — Locke Lord LLP

(57) ABSTRACT

Apparatus configured to receive a first end-to-end flow control representation for at least one logical connection from a first further apparatus to a second further apparatus, update at least one end-to-end credit value for the at least one logical connection from the first further apparatus to the second further apparatus dependent on the first end-to-end flow control representation, select at least one logical connection to the second further apparatus dependent on the end-to-end credit value, generate a second end-to-end flow control representation for the at least one logical connection to the second further apparatus, and transmit the second end-to-end flow control representation addressed to the second further apparatus.

20 Claims, 8 Drawing Sheets

(56) References Cited

U.S. PATENT DOCUMENTS

| | | | |
|---|---|---|---|
| 6,647,019 B1* | 11/2003 | McKeown et al. | 370/422 |
| 6,747,949 B1* | 6/2004 | Futral | 370/231 |
| 7,065,582 B1* | 6/2006 | Dwork et al. | 709/234 |
| 7,215,680 B2* | 5/2007 | Mullendore et al. | 370/412 |
| 7,694,049 B2* | 4/2010 | Goh et al. | 710/107 |
| 7,911,952 B1* | 3/2011 | Nygreen et al. | 370/235 |
| 8,103,788 B1* | 1/2012 | Miranda | 709/234 |
| 8,111,623 B2* | 2/2012 | Balandin et al. | 370/236 |
| 2002/0055993 A1* | 5/2002 | Shah et al. | 709/223 |
| 2004/0019729 A1 | 1/2004 | Kelley et al. | |
| 2004/0202155 A1* | 10/2004 | Natarajan et al. | 370/360 |
| 2005/0259651 A1* | 11/2005 | Yashima | 370/389 |
| 2006/0077898 A1* | 4/2006 | Yamaguchi et al. | 370/235 |
| 2006/0153078 A1* | 7/2006 | Yasui | 370/235 |
| 2006/0256723 A1* | 11/2006 | Hellenthal | 370/235 |
| 2007/0237076 A1* | 10/2007 | Balandin et al. | 370/229 |
| 2007/0255793 A1* | 11/2007 | Kwon et al. | 709/206 |
| 2008/0037428 A1* | 2/2008 | Nation et al. | 370/235 |
| 2008/0137669 A1 | 6/2008 | Balandina et al. | |
| 2010/0014421 A1* | 1/2010 | Willenborg et al. | 370/229 |
| 2010/0128607 A1* | 5/2010 | Dropps et al. | 370/235 |
| 2011/0216680 A1* | 9/2011 | Vogt et al. | 370/310 |

OTHER PUBLICATIONS

Office Action received for corresponding United Kingdom Patent Application No. 0821379.5, dated Mar. 11, 2009, 6 pages.

Office Action received for corresponding United Kingdom Patent Application No. 0821379.5, dated Dec. 3, 2009, 2 pages.

International Search Report and Written Opinion received for corresponding Patent Cooperation Treaty Application No. PCT/IB2009/054937, dated Mar. 9, 2010, 13 pages.

* cited by examiner

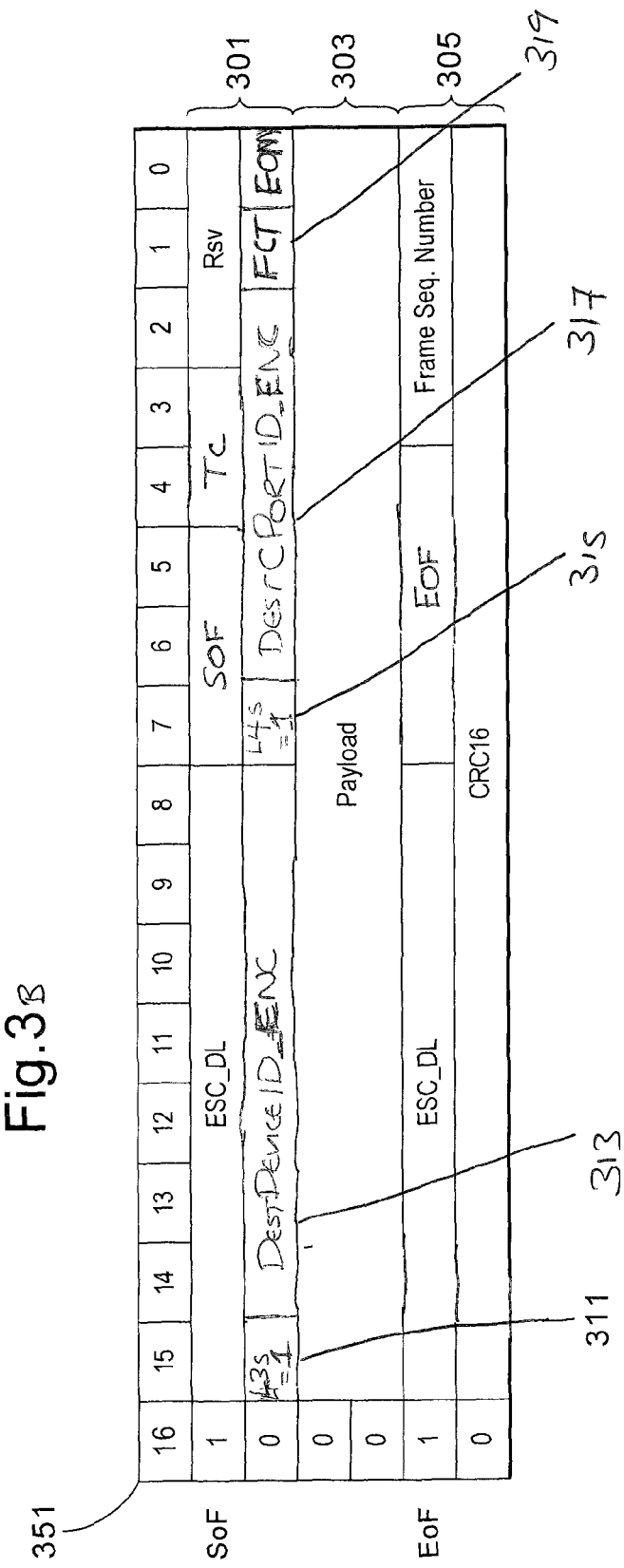

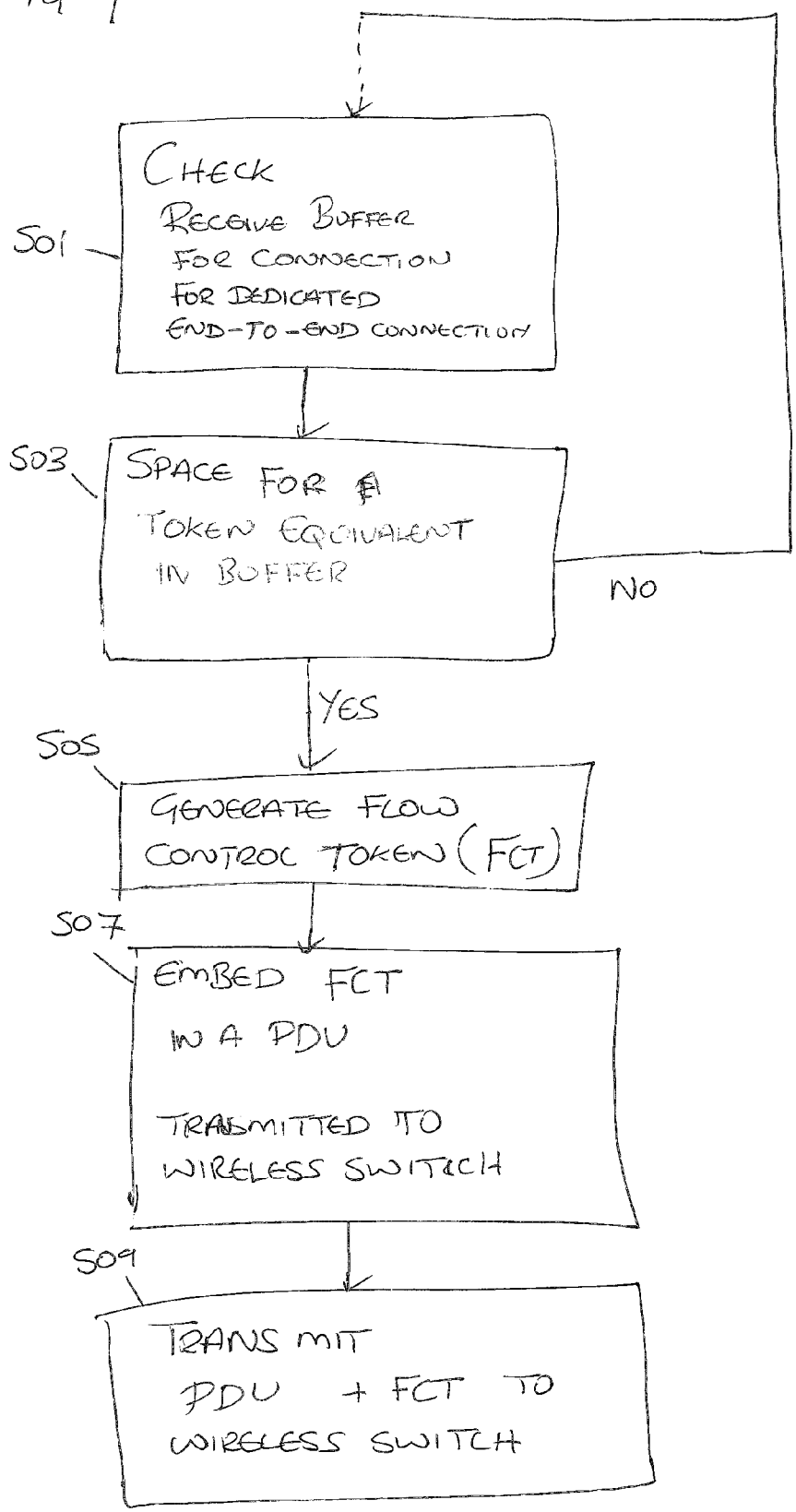

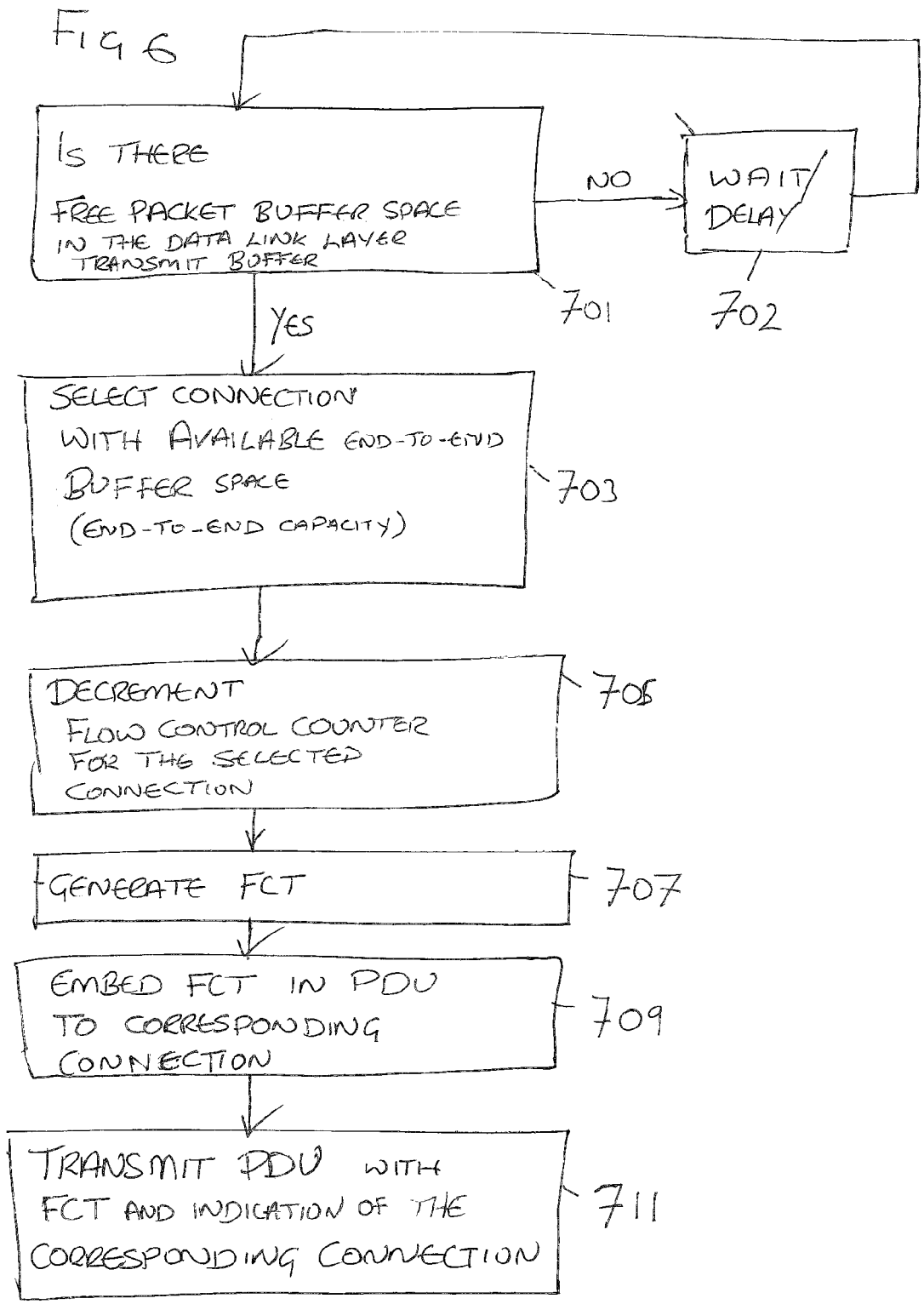

the invention, reference will now be made by way of example
to the accompanying drawings in which:

METHOD AND APPARATUS FOR USING LAYER 4 INFORMATION IN A LAYER 2 SWITCH IN ORDER TO SUPPORT END-TO-END (LAYER 4) FLOW CONTROL IN A COMMUNICATIONS NETWORK

RELATED APPLICATION

This application was originally filed as Patent Cooperation Treaty Application No. PCT/IB2009/054937 filed Nov. 6, 2009, which claims priority to Great Britain Application No. 0821379.5 filed Nov. 21, 2008.

TECHNICAL FIELD

The present application relates to a method and an apparatus more specifically but not exclusively to an apparatus configured to communicate between two devices operating on different networks.

DESCRIPTION OF THE RELATED ART

Communication environments can be quite varied. For example, within a single device or entity, there may be communications between different functionalities, nodes, modules and sub-systems within that device. Alternatively, two or more devices may be connected together and there may be communications between two or more of the devices. It is known to have two devices communicating with each other via one or more other devices such as in the context of a packet data network, a mobile communications network, system area network or the like. The packet data network provides communication between communicating devices using a layer protocol for interconnecting devices, components circuits or modules such as cellular telephones, handheld computers, digital cameras multimedia devices and/or the like. Beside that external systems can also be connected to the single device or entity to enable the single device or entity to be upgradeable.

The communication network might be based on a high-speed serial physical interconnect which may support several lanes operating at rates up to several Gbit per second per lane and may use low-voltage, source-synchronous, scalable-signalling technology. On the physical interconnect a protocol stack may operate. The protocol stack defines how data is transmitted across the physical network.

Some standards and the protocols implement data integrity checks—in other words checks to determine that the data transmitted by the data originator (or first end node) of the network has been received and is being processed by a data final destination (or second end node). Where the network nodes have a limited capacity for receiving and processing data typical network protocols implement a stop or discard process.

SUMMARY

Various aspects of the invention are set out in the claims.

There is provided according to a first aspect of the invention a method comprising: receiving a first end-to-end flow control representation for at least one logical connection from a first apparatus to a second apparatus; updating at least one end-to-end credit value associated with the at least one logical connection from the first apparatus to the second apparatus dependent on the first end-to-end flow control representation; selecting at least one of the at least one logical connection to the second apparatus dependent on an associated end-to-end credit value; generating a second end-to-end flow control representation for the at least one of the at least one logical connection to the second apparatus; and transmitting the second end-to-end flow control representation addressed to the second apparatus.

According to a second aspect of the invention there is provided apparatus comprising a processor configured to: receive a first end-to-end flow control representation for at least one logical connection from a first further apparatus to a second further apparatus; update at least one end-to-end credit value associated with the at least one logical connection from the first further apparatus to the second further apparatus dependent on the first end-to-end flow control representation; select at least one of the at least one logical connection to the second further apparatus dependent on an associated end-to-end credit value; generate a second end-to-end flow control representation for the at least one of the at least one logical connection to the second further apparatus; and transmit the second end-to-end flow control representation addressed to the second further apparatus.

According to a third aspect of the invention there is provided a computer-readable medium encoded with instructions that, when executed by a computer, perform: receiving a first end-to-end flow control representation for at least one logical connection from a first apparatus to a second apparatus; updating at least one end-to-end credit value associated with the at least one logical connection from the first apparatus to the second apparatus dependent on the first end-to-end flow control representation; selecting at least one of the at least one logical connection to the second apparatus dependent on an associated end-to-end credit value; generating a second end-to-end flow control representation for the at least one of the at least one logical connection to the second apparatus; and transmitting the second end-to-end flow control representation addressed to the second apparatus.

According to a fourth aspect of the invention there is provided an apparatus comprising: means for receiving a first end-to-end flow control representation for at least one logical connection from a first apparatus to a second apparatus; means for updating at least one end-to-end credit value associated with the at least one logical connection from the first apparatus to the second apparatus dependent on the first end-to-end flow control representation; means for selecting at least one of the at least one logical connection to the second apparatus dependent on an associated end-to-end credit value; means for generating a second end-to-end flow control representation for the at least one of the at least one logical connection to the second apparatus; and means for transmitting the second end-to-end flow control representation addressed to the second apparatus.

BRIEF DESCRIPTION OF THE DRAWINGS

For better understanding of the exemplary embodiments of the invention, reference will now be made by way of example to the accompanying drawings in which:

FIG. 3b shows an example schematic view of a packet data unit as employed by exemplary embodiments of the present invention;

FIG. 4 shows a flow diagram of the operation of a wireless device according to exemplary embodiments of the invention;

FIG. 6 shows a further flow diagram showing the operation of a wireless switch according to an exemplary embodiment of the invention.

DETAILED DESCRIPTION

The exemplary embodiments of the present invention relate but not exclusively to network architectures on top of wired and wireless network as employed to connect modules or functional nodes in a user equipment. The exemplary embodiments of the invention may be applicable to other user equipment networks for connecting elements or modules within user equipment or any other types of devices.

Figure 1:
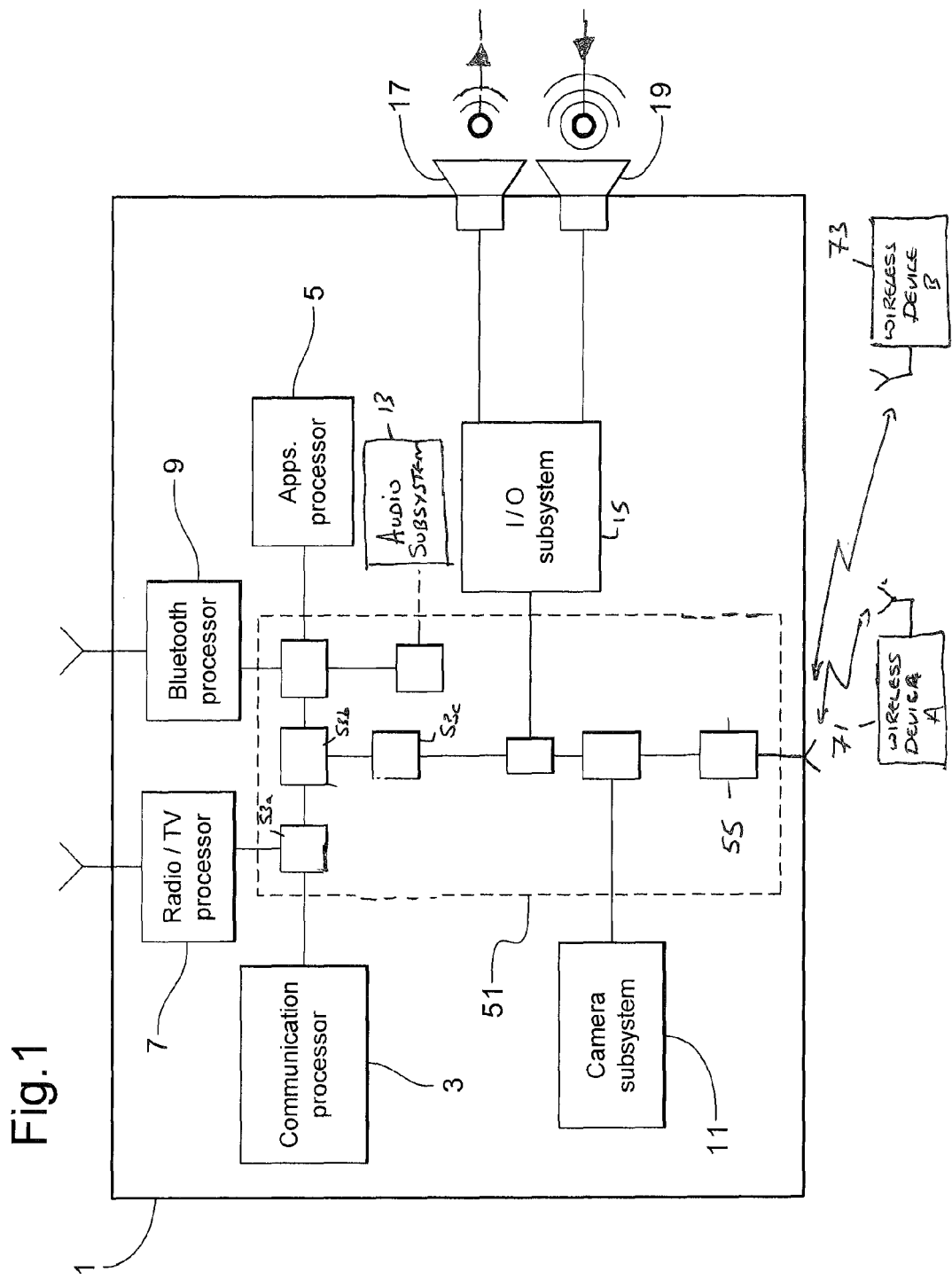
FIG. 1 shows a schematic view of a system area network over which exemplary embodiments of the present invention may be implemented.

Reference is made to FIG. 1 which shows a schematic view of a system area network comprised in a device. It comprises several components or sub-systems connected together via a wired network 51. For clarity components of the user equipment not directly concerned with the present invention are not shown.

It should be appreciated that while exemplary embodiments of the invention have been described in relation to user equipment such as mobile stations, the exemplary embodiments of the invention are applicable to any other suitable type of user equipment or apparatus. In this document the term, terminal, where used is intended to cover all the examples of apparatus described.

The term user equipment may apply to any type of device like a mobile device configured for wireless communication or any other type of processing. For example, the mobile user equipment may access the cellular network by means of a personal computer (PC), personal Data Assistant (PDA), mobile station (MS), digital camera, mobile computer, mobile terminal, multimedia device and so on.

The system area network 51 comprises a series of nodes 53 which act as switches or routers for receiving and distributing packets.

The system area network 51 is also shown connected to a series of processors, sub-systems and/or modules for carrying out various processes or applications associated with the user equipment. For example, the system area network is connected to a communications processor 3 (for communicating with the cellular network), an applications processor 5 (arranged to controlling the operation of applications), a radio/TV processor 7 (arranged to receive either analogue/digital radio/TV signals), a Bluetooth processor 9 (arranged to receive and transmit Bluetooth data over a Bluetooth communications channel), a camera sub-system 11 arranged to receive and transmit digital image data from the camera (the camera in some embodiments be connected to the system area network and transmit raw data to the camera sub-system 11), an audio sub-system 13 (arranged to transmit audio data for example MP3 audio data), and a I/O sub-system 15 connected to the earpiece/speaker 17 and/or the microphone 19. These processors/sub-systems described are examples only and some embodiments of the present invention may have more or fewer sub-systems connected to the system area network 51. Furthermore in some embodiments at least one sub-system is connected to the system area network 51 via an external connection not shown in FIG. 1.

In system area networks point-to-point (P2P) flow control may be used to guarantee reliability and packet integrity between nodes on link level (between two neighbour nodes). Additional end-to-end flow (E2E) may be used to guarantee reliability and packet integrity between end nodes in a system area network 51.

The device 1 furthermore shows a wireless switch 55 which is connected to at least one wired node like for example the switch via a wired connection and furthermore is configured to communicate to wireless devices via a wireless connection. The wireless devices are shown in FIG. 1 as wireless device A 71 and wireless device B 73. It would be appreciated that each wireless device may itself contain a system area network with one or more nodes. In a further embodiment the link might not be limited to a wireless link. Any kind of communication link including wired links may be applicable for the communication between the wireless switch and the wireless device.

Figure 2A:
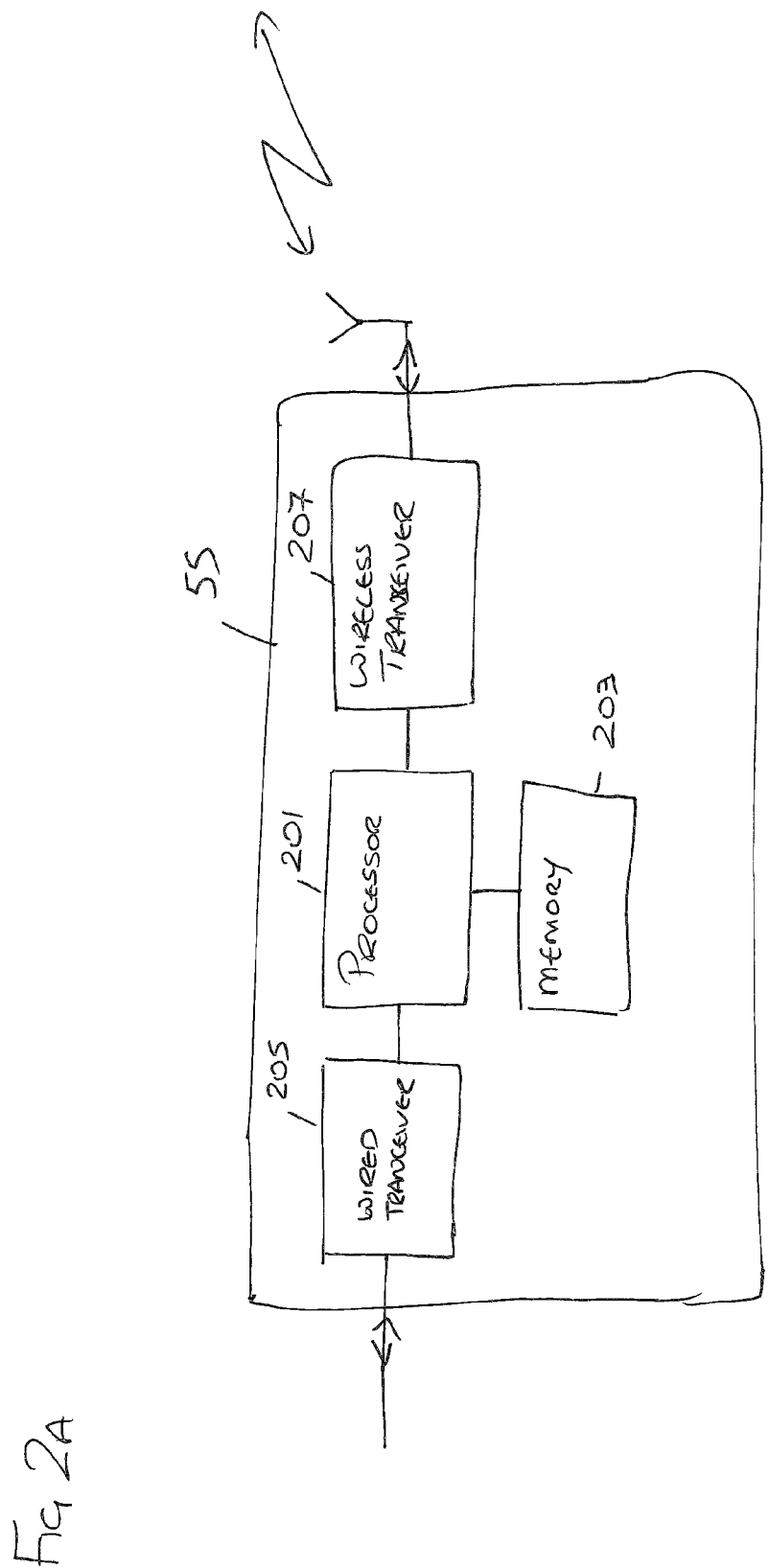
FIG. 2a shows a schematic view of the wireless switch according to exemplary embodiments of the invention.
Figure 2B:
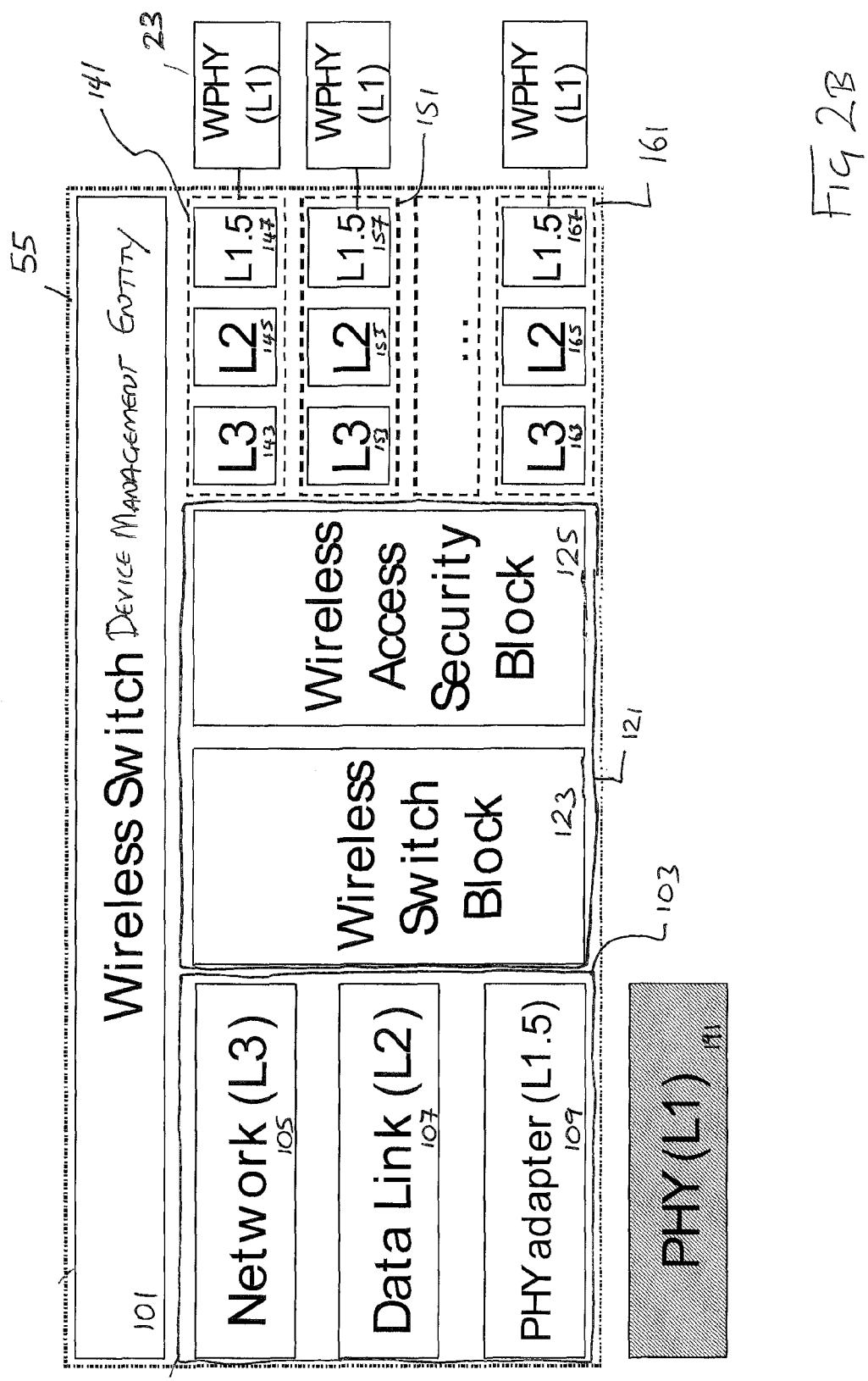
FIG. 2b shows a further schematic view of the wireless switch according to exemplary embodiments of the invention.

With respect to FIGS. 2a and 2b, the wireless switch is shown in further details. FIG. 2a shows schematically the wireless switch in terms of apparatus suitable for implementing a wireless switch according to the exemplary embodiments of the invention.

The wireless switch 55 comprises a processor 201 which is configured to be connected to memory 203. The processor 201 may be configured to execute various program codes. The implemented program codes comprise code for handling and processing data received at the switch and further comprise code for controlling the wired transceiver 205 and the wireless transceiver 207 for communicating either wirelessly, for example to wireless devices or other wireless switches, or by wire, for example to wired modules or network switches 53. The program code may be stored for example in the memory 203 for retrieval by the processor 201 whenever needed. The memory 203 may further provide a section 24 for storing the received packet data, for example data that is being processed by the processor 201. The program code may, in exemplary embodiments of the invention, be implemented completely in hardware or firmware.

In some exemplary embodiments of the invention the wireless switch 55 is not implemented with the transceiver elements and instead the data and control signals transmitted to dedicated wired, wireless interface transceivers and/or the like.

FIG. 2b shows a further schematic view of the wireless switch 55 according to exemplary embodiments of the invention. It is described with respect to the functional modules which may be implemented in exemplary embodiments of the invention. These functional modules may be implemented in exemplary embodiments of the invention by a series of processes running on the processor 201. In other exemplary embodiments of the invention the modules may be implemented in specific hardware or programmed firmware.

The wireless switch 55 thus may comprise a wireless switch device management entity (DME) 101 configured to control the operation of the wireless switch.

The wireless switch 55 furthermore comprises a wired module 103, the wired module 103 comprises a series of sub-modules configured to perform the various levels of network protocol operations on data received over the wired connection or connections to the wireless switch.

The wired module 103 comprises a network (L3) sub-module 105, a data link (L2) sub-module 107 and a physical adapter (L1.5) sub-module 109. The physical adapter sub-module (L1.5) may then be configured to interact with a physical layer adapter (L1) 191 which may be in some embodiments of the invention be the wired transceiver 205 and which may or may not be part of the wireless switch 55.

The wireless switch further comprises a management module which comprises a wireless switch block 123, and a wireless access security block 125. The wireless access security block 125 may be configured to ensure that wireless connection with different level of security problems will not be directly connected to the core network.

The wireless switch 55 is further shown to comprise one or more wireless modules. Each wireless module may support one or more connections whereby the connections may be established over one or more different traffic classes. In the exemplary FIG. 2b there are three wireless modules shown, however it would be appreciated that the wireless switch in exemplary embodiments of the invention may have any number of wireless modules. Each of the wireless modules, the first wireless module 141, the second wireless module 151, and the third wireless module 161 may be configured to have a series of sub-modules similar to the wired sub-modules. Thus the wireless modules 141, 151, 161 may each comprise a network sub-module (L3) 143, 153, 163; a data link sub-module (L2) 145, 155, 165; and a physical adapter sub-module (L1.5) 147, 157, 167. The wireless physical adapter sub-module is shown furthermore connected to a wireless physical adapter (L1) 23 (which may be considered to be in some embodiments of the invention the wireless transceiver 207) which may optionally be part of the wireless switch.

Even the sub-modules of the wireless modules 141, 151, 161 and wired module 103 are shown as separate entities in some embodiments a different partitioning might be used whereas one or several sub-modules are combined to one or several entities.

Figure 3A:
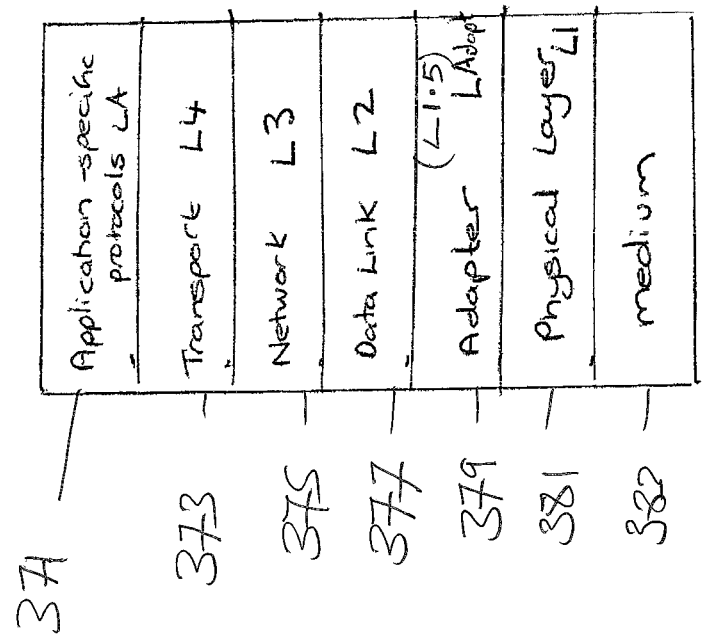
FIG. 3a shows a schematic view of the network layers model as applied to the exemplary embodiments of the invention.

Reference is now made to FIG. 3a which shows the protocol stack of layers used in exemplary embodiments of the invention and with regard to the wired and wireless modules shown in FIG. 2b. The protocol stack may be similar to the OSI signalling system #7 (SS7) network model.

In the arrangement shown in FIG. 3a, there is shown an application specific protocol layer (LA) 371. The application specific protocol layer uses messages to describe the activity for payload and transaction semantics.

The application layer may be on top of the transport layer (L4) 373. The transport layer may use segments within the messages or parts of messages are embedded to describing which port of which device the message is required to end up at. The transport layer may furthermore controls the end-to-end flow control mechanisms of the data. Further the transport layer may provide logical channels or connections between two end nodes or devices (end-to-end connection) which are identified by device and port identifications.

The transport layer (L4) is in turn on top of the network layer (L3) 375. The network layer (L3) 375 may use packets within which the segments are embedded and controlling the addressing and routing of packets sent between various network layers.

The network layer (L3) 375 may be in turn on top of the data link layer (L2) 377. The data link layer may use frames within which the packets are embedded and controlling single hop reliability (otherwise known as point-to-point flow control). The data link layer may comprise one or more traffic classes. Furthermore the data link layer may be configured to control the priority based arbitration system for the different traffic classes to controls which type of data is to be passed from node to node or device to device. For this purpose the data link layer may provide transmit and receive buffers. They may use to store frames that are received or should be transmitted. If the data link layer supports several traffic classes dedicated buffers may be available for each traffic class.

The data link layer (L2) 377 furthermore may lie on top of the physical adapter layer (L1.5 or LAdapt) 379. The physical adapter layer takes the frame data and converts it into symbols.

The physical adapter layer (L1.5) 379 furthermore may lie on top of the physical layer (L1) 381 which may be configured to control signalling, synchronisation, line encoding, and power mode operation. As described previously the physical layer (L1) and/or the upper protocol layers may be considered to be the transceiver elements.

FIG. 3b shows one exemplary implementation of a packet data unit (PDU) 351 which may be used in exemplary embodiments of the invention and shows data which may be processed by various transport, network and/or data link layers.

The PDU 351 shows an example single segment within which the packet, and frame information is embedded. The segment comprises a header 301, body 303 and tail portion 305.

The header 301 comprises the fields: ESC_DL which is a special code, which allows to distinguish control symbols from data symbols, SOF which is a code that tells that this control symbol starts a new frame, TC which defines the traffic class or priority level which identifies to which priority group the frame belongs, Rsv which is a reserved field.

The header 301 further comprises a L3 or network layer indicator 311 which indicates that the packet contains L3 (network layer) information, network layer information 313 DestDeviceID_ENC (the device destination ID for the segment information), in other words the device to which the PDU is addressed.

The header 301 further comprises L4 or transport layer indicator 315 which indicates that there is L4 or transport layer information also within the PDU. The L4 information comprises the port identifier value DestCPortID_ENC 317 which determines which port of the addressed device the data is for, and a flow control token bit (FCT) 319. Based on DestCPortID_and DestDeviceID_ENC the end-to-end connection may be identified.

The header 301 further comprises an EOM bit which indicates that this frame is the last frame of the transport layer message (which for transmission over the system area network might be split to a number of data link layer frames).

The body 303 of the segment contains the payload field, the payload may be the user or application data to be transmitted.

The tail 305 of the segment comprises the fields: ESC_DL, EOF which indicates that this is the last control symbol of the frame, frame sequence number which is a sequence number of the frame in the data link layer transmission, which is used for providing P2P reliability, and CRC16 which is a 16 bit cyclic redundancy check value of the payload data.

Figure 5:
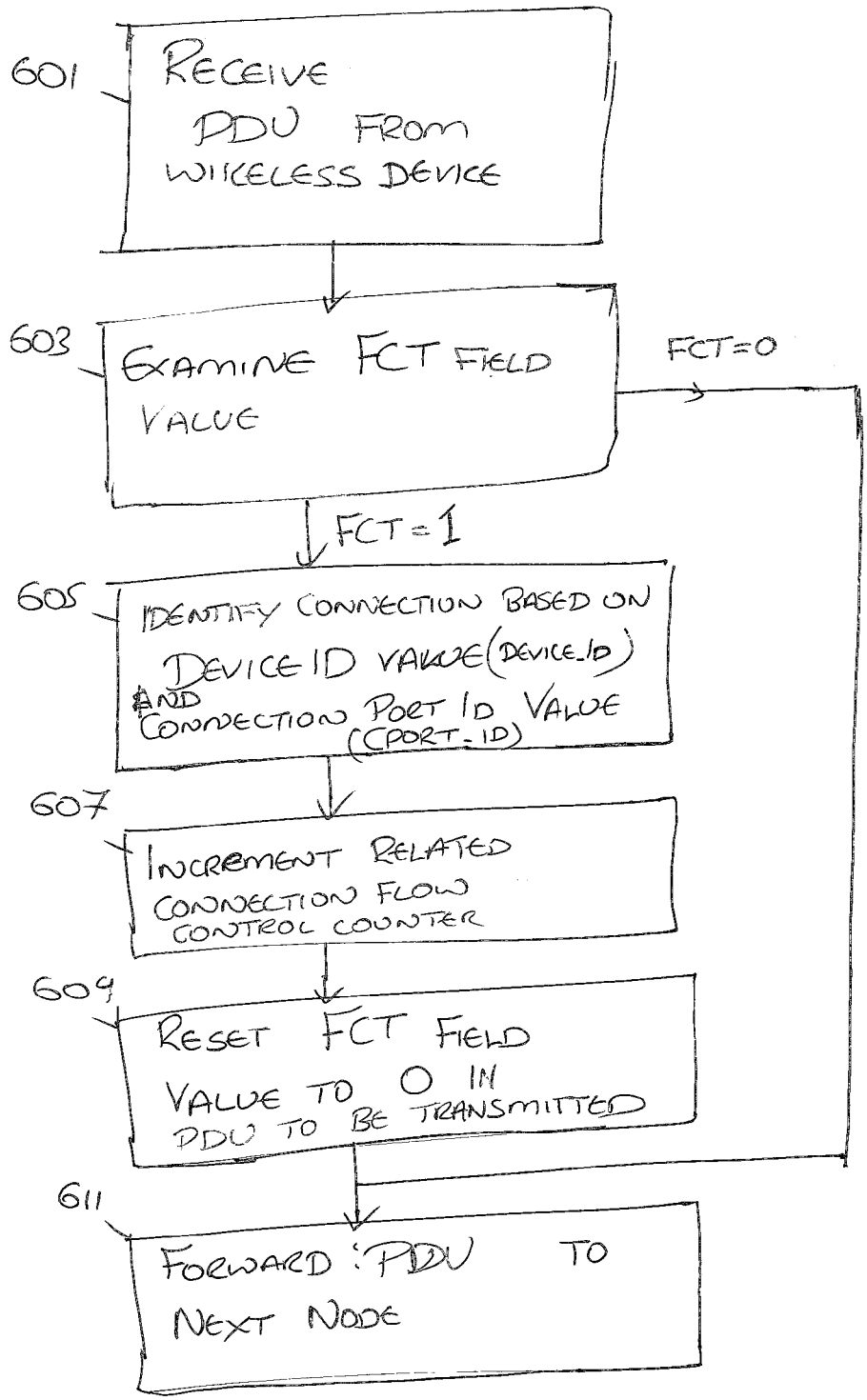
FIG. 5 shows a flow diagram of the operation of a wireless switch according to an exemplary embodiment of the invention.

With respect to FIGS. 4 to 6 a series of operations carried out by the wireless device in communication with the wireless switch and the wireless switch with regards to exemplary embodiments of the invention are described in further detail.

With respect to FIG. 4 and FIG. 5, a series of operations are shown with regards to the wireless module of the wireless switch 55. For example FIG. 4 shows the operation with regards to a wireless device and/or node 71, 73 in communication with the wireless switch 55, and FIG. 5 shows the exemplary operation of the wireless switch 55 in response to the operations shown in FIG. 4.

The wireless node or device 71 may comprise a processor and buffer arrangement for handing the associated data transfer from and to the wireless switch. The processor may be configured to perform a check of the wireless device or node receiver buffer for a dedicated end-to-end connection. The checking of the wireless node receiver buffer for a dedicated end-to-end connection is shown in FIG. 4 by step 501.

The processor then checks whether or not there is space for a PDU to be received at the wireless device for the end-to-end connection. The determination of whether or not there is space for the connection for a PDU to be received at the wireless device is shown in FIG. 4 by step 503.

If there is no space for a PDU a dedicated connection to be received, the operation loops back after a delay of some form to the previous step 501 where the processor requests a check of buffer. If there is space in a buffer for a PDU of a dedicated connection to be received at the wireless device, the operation proceeds to the next operation, step 505. The checking of available space may be done based on a comparison to a given threshold that may be equivalent to a token.

The processor of the wireless device may then generate a flow control token representing the availability of space for a PDU for a dedicated connection that may be identified by the destination device ID (DestDeviceID_ENC) and destination port ID (DestCPortID_ENC) in a receiving buffer. The operation of generating a flow control token (FCT) is shown in FIG. 4 by step 505.

The processor then embeds the flow control token either within a new PDU to be transmitted to the wireless switch or embeds the flow control token within a PDU already in the process of being assembled and transmitted to the wireless switch, for example as part of a segment being transmitted from the wireless device via the wireless switch. Thus a PDU has been generated with the flow control token enabled for a given connection. This is shown in FIG. 4 by step 507.

The wireless device then transmits the PDU with the flow control token enabled to the wireless switch 55. The operation of transmitting the PDU and the flow control token to the wireless switch is shown in step 509 of FIG. 4.

FIG. 5 as described above, shows how exemplary embodiments of the invention are implemented within the wireless switch 55 in response to receiving the PDU with flow control tokens from the wireless device.

The wireless switch 55 receives the PDU from the wireless node with the flow control token enabled. The example operation of receiving the PDU from the wireless device/node is shown in FIG. 5 by step 601. The wireless switch may be configured to handle for each connection towards the wireless node a flow control counter that represents the available buffer space at the wireless node that has provided flow control token. Beside that the wireless switch may support one or more traffic classes and each traffic class may be used for one or more end-to-end connections.

The processor of the wireless switch 55 then determines the value of the flow control token (FCT) field. The examination of the flow control token (FCT) field value is shown in FIG. 5 by step 603.

Where the flow control token value is, for example, equal to 0 or FALSE, the operation processes the PDU received from the wireless device as if it received a normal PDU. Thus, the PDU may be forwarded to the next node or switch as determined by the routing information. The related connection flow control counter will not be updated as no free space is available.

Where the flow control token (FCT) has, for example, a value of 1 or TRUE, the operation then reads the device identification value DestDeviceID_ENC and the connection port identification value DestCPortID_ENC, in other words the processor identifies to which device and which port (end-to-end connection) the PDU has been addressed to. The reading and identification of the device and port values is shown in FIG. 5 by step 605.

The wireless device processor then increments the related connection flow control counter value for the connection indicated from the flow control token. The connection flow control counter value increase is shown in FIG. 5 by step 607.

Furthermore the processor may then reset the flow control token (FCT) field value in the PDU to 0.

The operation of resetting the flow control token field value to 0 in the PDU is shown in FIG. 5 by step 609.

Then the processor may forward the PDU to the next switch dependent routing algorithm employed and uses any routing algorithm. This operation may be the same as the operation following directly after the determination of the FCT value being equal to 0. The operation of forwarding the segment or PDU to the next node or switch is shown in FIG. 5 by step 611. There may be scenarios where the forwarding is not done because the flow control token may be included in a PDU generated specifically for the flow control token.

With respect to FIG. 6, the operation of the wireless switch 55 according to a further exemplary embodiment of the invention with regards to the wired part of the system area network is shown in further details. The wireless switch processor may perform a check of whether or not there is free buffer space in the data link layer transmit buffer towards the wireless port. This check may be based on a check against a threshold value that for example represents the token size.

The operation of checking is shown in FIG. 6 by step 701.

Where there is no free buffer space, the processor may wait or delay before re-performing the check again at some point. This waiting or delay as shown in FIG. 6 by the operation 702 may be configured to delay or wait according to a specific time period or based on a specific trigger element or event.

Where there is at least free space in the at least one link layer buffer of a wireless port that is equivalent or bigger than one token representation, the processor then selects an end-to-end connection from a wireless port where the related flow control counter indicates that there is buffer space available in the wireless node. This selection may be carried out based on a round robin principle, in other words the next FCT requesting connection is selected, or a selection may be performed based on any possible mechanism, such as weighted round robin or biased selection processes. Furthermore the selection may be performed dependent on the end-to-end connection buffer having capacity greater than a further threshold.

In some embodiments of the invention the further threshold may be the same value as the threshold described above with respect to the data link layer transmit buffer.

The priority handling (traffic class) operations in embodiments of the invention are processed on data link layer. Further there may be several logical connections available for each traffic class. For example there may be 5 logical connections on a first traffic class, traffic class 0, and a further 2 logical connections on a second traffic class, traffic class 1. Thus in embodiments of the invention the layer 2, data link layer, buffer associated with each traffic class may be shared between different connections provided each connection uses the same traffic class.

The selection of an end-to-end connection from a wireless port from at least one buffer with free space is shown in FIG. 6 by operation 703.

The wireless switch processor then furthermore may decrement the related connection flow control counter for the selected end-to-end connection. The operation of decrementing the flow control counter for the selected connection is shown in FIG. 6 by step 705.

The wireless switch processor then generates a flow control token. The operation of generating a flow control token is shown in FIG. 6 step 707.

Furthermore the processor then may embed the generated flow control token with a PDU to the selected connection. The PDU may already be in the process of being generated and the flow control token embedded in a PDU or the flow control token may be embedded in a PDU generated specifically for the flow control token.

The operation of embedding the flow control token within the PDU to the selected end-to-end connection is shown in FIG. 6 by step 709.

The processor furthermore transmits the PDU and active flow control token to the corresponding selected connection via the system area network 51. The operation of transmitting the flow control token is shown in FIG. 6 by step 711.

The wireless switch block module may perform routing functionality and in addition implements the split in two segments of the end-to-end flow control connection as described in exemplary embodiments above. The end-to-end flow control is used additionally to the point-to-point flow control that is provided by the data link layer.

This permits the wireless switch 55 to hide the split of the end-to-end flow control connection between the wired and wireless parts of the system area network. In these exemplary embodiments, there are two end-to-end flow control connections that are bridged in the wireless switch 55. The first end-to-end flow control connection covers the wired part of the connection as described with respect to FIG. 6 and the second end-to-end flow control connection covers the wireless part of the connection as described with regards to FIGS. 4 and 5.

In these exemplary embodiments of the invention, it is possible to reduce the head of line blocking in the wired part of the network because of the slower and less reliable wireless connection is separated from the wired connection. Furthermore the end-to-end flow control split handling mechanism may be completely hidden from the rest of the network and does not require the wireless switch to make full emulation of upper layer functionality like transport layer. This allows the device to be implemented without large additional buffers that would be needed in the wireless switch to prevent head of line blocking. The wireless switch is configured to use the data link layer transmit buffer (for outgoing traffic towards the wireless node) which might be logically separated for different traffic classes to emulate the availability of upper layer buffers. Thus the end-to-end flow control simply organises the separate handling of segments with set flow-control and initiates new L4 flow control tokens when needed and if data link layer buffer has free space.

In other words, as shown in FIGS. 4 and 5, when the wireless switch receives a PDU from the wireless port, it may check the value of the L4 FCT field and the port and device value and increments the related flow control counter. For the wired part of the connection, it is possible then to organise granting of flow control token to L4 flows using whatever principle, for example round robin, so that for the wired part of the connection, the block generates new empty PDUs or set the end-to-end flow control token to 1 for passing PDUs of a given flow every time when the corresponding outgoing buffer has space for one data proportion of flow control size and the corresponding counter of flow control tokens for a given flow is more than 0.

As would be understood, this embodiment of the invention may be used with any size of the buffer and the wireless interface of the wireless switch. Furthermore it may be noted that the end-to-end flow control modifications as described in the exemplary embodiments of the invention are proposed only in the outgoing wireless link end-to-end flow control as the reverse direction is not congested as the bottle neck occurs after the very first hop. But it would be applicable to use a similar approach for the reverse direction.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto.

While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The exemplary embodiments of this invention may be implemented by computer software executable by a data processor of the apparatus, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples. The processor or processors in some embodiments of the invention may be application specific integrated circuits (ASIC) or any form of data processing arrangement. For example the processors may be implemented using custom integrated circuit implementations, or using field programmable gate arrays (FPGA) or any technology using sea-of-gates configurations.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method comprising:
receiving, at a switch, a first end-to-end flow control representation for at least one logical connection from a first apparatus to a second apparatus. wherein the first apparatus is subject to a first link, wherein the second apparatus is subject to a second link, and wherein the second link is of lower performance than the first link;
updating, at the switch, at least one end-to-end credit value, the at least one end-to-end credit value associated with one of the at least one logical connection from the first apparatus to the second apparatus based on the first end-to-end flow control representation;
selecting, at the switch, at least one of the at least one logical connection from the first apparatus to the second apparatus based on an associated end-to-end credit value, wherein said selection is carried out based on organized granting by said switch;
generating, at the switch, a second end-to-end flow control representation for the at least one of the at least one logical connection from the first apparatus to the second apparatus; and
determining to transmit, from the switch, the second end-to-end flow control representation addressed to the second apparatus,
wherein the switch bridges end-to-end flow control of said first link and end-to-end flow control of said second link.

2. The method as claimed in claim 1, wherein receiving the first end-to-end flow control representation comprises receiving a packet data unit comprising the first end-to-end flow control representation.

3. The method as claimed in claim 2, further comprising:
resetting the first end-to-end flow control representation; and
determining to transmit the packet data unit.

4. The method as claimed in claim 1, wherein updating the at least one end-to-end credit value comprises incrementing the at least one end-to-end credit value when the first end-to-end flow control representation is a first value.

5. The method as claimed in claim 4, wherein the first value indicates the first apparatus has capacity to receive a packet data unit from the second apparatus.

6. The method as claimed in claim 1, wherein selecting at least one logical connection from the first apparatus to the second apparatus based on an associated end-to-end credit value comprises:
determining capacity in at least one link layer buffer associated with at least one of the at least one logical connections to the first apparatus is greater than a threshold value; and
determining the end-to-end credit value associated with the at least one of the at least one logical connections to the first apparatus is greater than a further threshold value.

7. The method as claimed in claim 6, wherein the threshold value and the further threshold value is a token value size.

8. The method as claimed in claim 6, wherein each link layer buffer represents a different traffic class or priority level.

9. The method as claimed in claim 1, wherein generating the second end-to-end flow control representation for the at least one logical connection to the second apparatus comprises at least one of:

embedding the second end-to-end flow control representation in a packet data unit addressed to the second apparatus; and
generating the packet data unit comprising the second end-to-end flow control representation.

10. The method as claimed in claim 1, operated over a point-to-point flow control method.

11. The method as claimed in claim 1, wherein the first end-to-end flow control representation comprises a token.

12. The method as claimed in claim 1, wherein the second end-to-end flow control representation comprises a token.

13. A switch apparatus comprising:
at least one processor; and
at least one memory including computer program code, the at least one memory and the computer program code configured to, with the at least one processor, cause the switch apparatus at least to perform:
receive, at the switch apparatus, a first end-to-end flow control representation for at least one logical connection from a first apparatus to a second apparatus, wherein the first apparatus is subject to a first link, wherein the second apparatus is subject to a second link, and wherein the second link is of lower performance than the first link;
update, at the switch apparatus, at least one end-to-end credit value, the at least one end-to-end credit value associated with one of the at least one logical connection from the first apparatus to the second apparatus based on the first end-to-end flow control representation;
select, at the switch apparatus, at least one of the at least one logical connection from the first apparatus to the second apparatus based on an associated end-to-end credit value, wherein said selection is carried out based on organized granting by said switch apparatus;
generate, at the switch apparatus, a second end-to-end flow control representation for the at least one of the at least one logical connection from the first apparatus to the second apparatus; and
determine to transmit, from the switch apparatus, the second end-to-end flow control representation addressed to the second apparatus,
wherein the switch apparatus bridges end-to-end flow control of said first link and end-to-end flow control of said second link.

14. The apparatus as claimed in claim 13, wherein the at least one memory and the computer program code are further configured to, with the at least one processor, cause the apparatus to;
receive a packet data unit comprising the first end-to-end flow control representation.

15. The apparatus as claimed in claim 14, wherein the at least one memory and the computer program code are further configured to, with the at least one processor, cause the apparatus to:
reset the first end-to-end flow control representation; and
determine to transmit the packet data unit.

16. The apparatus as claimed in claim 13, configured to operate over a point-to-point flow control method.

17. The apparatus as claimed in claim 13, wherein the first end-to-end flow control and the second end-to-end flow control representation comprises a token.

18. An electronic device comprising apparatus as claimed in claim 13.

19. A chipset comprising apparatus as claimed in claim 13.

20. A computer program product comprising computer executable program code recorded on a non-transitory computer-readable storage medium, the computer executable program code comprising:
   code for causing receipt, at a switch, of a first end-to-end flow control representation for at least one logical connection from a first apparatus to a second apparatus, wherein the first apparatus is subject to a first link, wherein the second apparatus is subject to a second link, and wherein the second link is of lower performance than the first link;
   code for causing update, at the switch, of at least one end-to-end credit value, the at least one end-to-end credit value associated with one of the at least one logical connection from the first apparatus to the second apparatus based on the first end-to-end flow control representation;
   code for causing selection, at the switch, of at least one of the at least one logical connection from the first apparatus to the second apparatus based on an associated end-to-end credit value, wherein said selection is carried out based on organized granting by said switch;
   code for causing generation, at the switch, of a second end-to-end flow control representation for the at least one of the at least one logical connection from the first apparatus to the second apparatus; and
   code for causing determination to transmit, from the switch, the second end-to-end flow control representation addressed to the second apparatus,
   wherein the switch bridges end-to-end flow control of said first link and end-to-end flow control of said second link.

* * * * *